United States Patent
Pirzanski

(10) Patent No.: US 10,325,418 B1
(45) Date of Patent: Jun. 18, 2019

(54) 3D VIRTUAL AUTOMATED MODELING OF CUSTOM POSTERIOR CONCHA MODULE

(71) Applicant: Chester Zbigniew Pirzanski, Brampton (CA)

(72) Inventor: Chester Zbigniew Pirzanski, Brampton (CA)

(*) Notice: Subject to any disclaimer, the term of this patent is extended or adjusted under 35 U.S.C. 154(b) by 0 days.

(21) Appl. No.: 16/217,295

(22) Filed: Dec. 12, 2018

Related U.S. Application Data

(60) Provisional application No. 62/767,562, filed on Nov. 15, 2018.

(51) Int. Cl.
  *G06T 19/20* (2011.01)
  *G06T 17/00* (2006.01)
  *H04R 25/00* (2006.01)

(52) U.S. Cl.
  CPC ............ *G06T 19/20* (2013.01); *G06T 17/00* (2013.01); *H04R 25/658* (2013.01)

(58) Field of Classification Search
  CPC .... H04R 25/65; H04R 25/652; H04R 25/658; G06T 17/00
  See application file for complete search history.

(56) References Cited

U.S. PATENT DOCUMENTS

| | | | |
|---|---|---|---|
| 7,084,870 B2 | 8/2006 | Fang | |
| 7,286,679 B2 | 10/2007 | Fang | |
| 7,308,328 B2 * | 12/2007 | Fang | H04R 25/652 264/222 |
| 7,447,556 B2 | 11/2008 | McBagonluri | |
| 7,605,812 B2 * | 10/2009 | McBagonluri | G06F 17/5009 345/420 |
| 7,609,259 B2 | 10/2009 | McBagonluri | |
| 7,801,708 B2 | 9/2010 | Unal | |
| 7,991,594 B2 | 8/2011 | Unal | |
| 8,032,337 B2 | 10/2011 | Deichmann | |
| 8,064,731 B2 * | 11/2011 | Zouhar | G06K 9/00214 345/419 |
| 8,190,280 B2 * | 5/2012 | Bindner | G05B 19/4097 700/98 |
| 8,229,180 B2 * | 7/2012 | Baloch | G06K 9/00201 345/420 |
| 8,285,408 B2 * | 10/2012 | Schiller | G06F 17/50 700/98 |
| 1,015,895 A1 | 12/2018 | Pirzanski | |
| 10,158,954 B1 * | 12/2018 | Pirzanski | H04R 25/652 |
| 2012/0068379 A1 | 3/2012 | Klemenz | |
| 2015/0073262 A1 * | 3/2015 | Roth | A61B 5/1077 600/411 |

FOREIGN PATENT DOCUMENTS

CA  2408449 C  2/2009
WO  WO-117407 A2  11/2006

* cited by examiner

*Primary Examiner* — Joshua T Kennedy

(57) ABSTRACT

A virtual 3D modeling of a custom posterior concha module from a digital ear impression. This modeling is done with 3D inserts that fill the posterior concha area and are merged into a concha ring, concha plate, or another custom solid or hollow 3D object. The 3D object is integrated with the custom concha and custom canal modules. The resulting 3D mold is the virtual custom hearing aid shell or earmold. This method is suitable for modeling Full-Shell custom hearing aids, and Full-Shell, Shell, Skeleton, and Semi-skeleton earmolds. It is also applicable to modeling a Canal-lock and Helix-lock.

1 Claim, 6 Drawing Sheets

Posterior- Anterior

Lateral view

3D VIRTUAL AUTOMATED MODELING OF CUSTOM POSTERIOR CONCHA MODULE

RELATED US APPLICATION DATA

This application claims the benefit of provisional patent application No. 62/767,562, entitled 3D virtual automated modeling of custom concha module, filed on Nov. 15, 2018 by the inventor.

BACKGROUND OF THE INVENTION

This invention relates to a process for the production of custom-moulded ear inserts that are required for ear-level hearing aids and earmolds.

The shape of a custom mould is derived from an ear impression taken individually from the subject's ear. The ear impression is a negative replica of the ear.

There are currently two methods of impression shaping into custom moulds.

The older method is manual impression shaping. In this process, the impression is shaped manually by a technician with the use of mechanical cutters and grinders. The technician removes outer layers from the impression to achieve a mould shape suitable for a given custom product.

The newer method is computer-aided shaping of a digital ear image that is obtained by scanning of silicone impression, direct in-ear scanning, CT scanning, MRI scanning, or any volumetric imaging technique, and is further called a digital impression. In this process, the digital impression is virtually shaped with cutting and grinding tools available in the software.

Both the manual shaping and computer-aided modeling methods are time consuming, subjective, intuitive, and not free from inaccuracies. Inaccuracies in impression shaping result in ear moulds that have inadequate fit and are subsequently returned to the manufacturer with either a request for a new earpiece, or a request for a refund.

There are inventions that disclose automated processes where a pre-modelled shell stored in a computer database is matched with a custom ear impression. This approach requires a large number of pre-modelled shells to cover the almost unlimited number of human ear shapes and sizes, and the great variety of custom hearing aid styles and options, which renders this concept impractical. In addition, a shell selected from a computer database is not a custom product.

U.S. Pat. No. 10,158,954 by Pirzanski discloses a virtual method for modeling a custom canal module from a digital impression with the use of templates with predetermined shapes. In this method, 2D templates are inserted into the impression, aligned with the impression contour lines, assembled into a 3D frame, and surfaced. The resulting 3D mould is a virtual custom canal module. The limitation of this method is that 2D templates are insufficient for modelling the concha that features a sophisticated spatial form.

This drawback is partially solved by Pirzanski proposing virtual modeling of the concha that comprises a combination of 3D custom and 3D pre-modelled modules that are integrated into a virtual custom concha module. Still, this method is inadequate for modelling full concha modules that reside into the posterior concha, helix and anti-tragus.

This disclosure describes an innovative method for modeling custom posterior concha modules.

This innovation provides the means of manufacturing custom product that is globally uniformed in physical fit and cosmetic appearance.

BRIEF SUMMARY OF THE INVENTION

The foregoing advantages and features are presented to assist in understanding the invention. They are not intended to be considered limitations on the invention, and should therefore not be considered dispositive in determining equivalents.

The purpose of the invention is to automate the process of virtually modeling hearing aid shells and earmolds, shorten modeling time, eliminate subjective and intuitive decisions made by the software operator, and improve the quality of the custom product.

According to this invention, to create a virtual custom hearing aid shell or earmold, two or three virtual custom modules are required, all derived from the same digital impression obtained from the individual ear.

The modules are:
 a. The canal module 600
 b. The concha module 500
 c. The posterior concha module 400

The canal module 600 modelling is disclosed in U.S. Pat. No. 10,158,954 by Pirzanski.

The concha module 500 modelling is disclosed in U.S. patent application Ser. No. 16/217,246.

The posterior concha module 400 modelling is disclosed below.

The canal module 600 and the concha module 500 are required for Half-Shell, Canal, Completely-In-Canal and Invisible-In-Canal style hearing aids, and custom Half-Shell and Canal style earmolds.

The canal module 600, the concha module 500, and the posterior concha module 400 are required for Full-Shell hearing aids and Full-Shell, Shell, Skeleton, and Semi-skeleton earmolds, and options such as Canal-lock and Helix-lock.

At the end of the modeling process, the required modules are integrated into the virtual custom hearing aid shell 700, or earmold. The hearing aid shell is hollow, the earmold is solid.

DETAILED DESCRIPTION OF THE INVENTION

This disclosure describes modeling of the custom posterior concha module from a digital impression.

Figure 1:
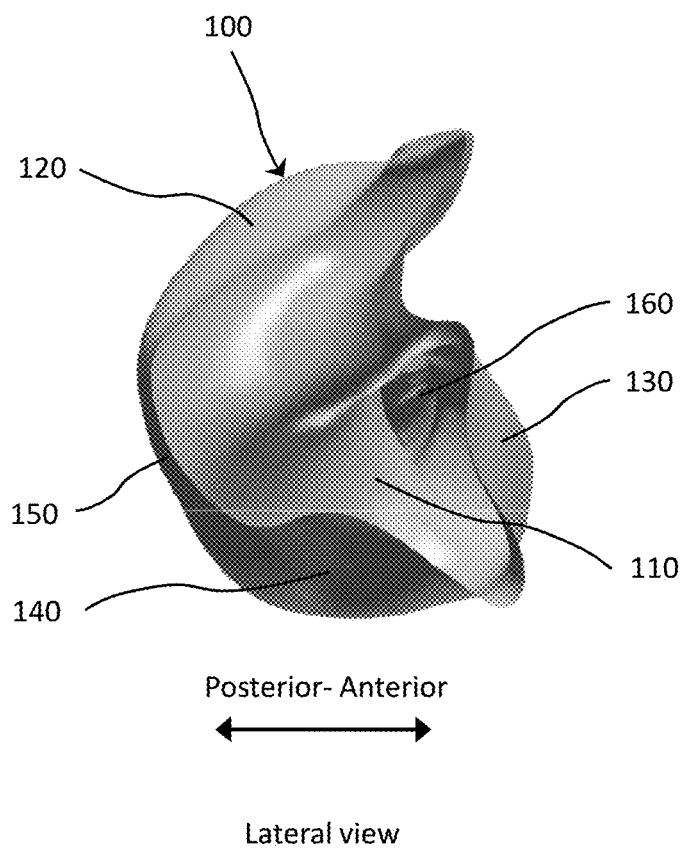
FIG. 1 shows details of the human ear.

FIG. 1 illustrates anatomical features of the human ear captured in the digital impression 100. In this lateral view, the following parts of the digital impression 100 are visualized:
 Concha 110
 Helix 120
 Tragus 130
 Anti-tragus 140
 Posterior concha 150
 Ear canal 160

To be sufficient for this modelling method, the digital impression 100 must be free from major abnormalities, voids, and surgical alterations.

The areas of the helix 120, tragus 130, anti-tragus 140, and the back of the concha 150 feature undercuts that overhang hollow spaces. The posterior concha module 400 resides in those hollow spaces and enhances retention for custom hearing aid shells and earmolds.

Figure 2A:
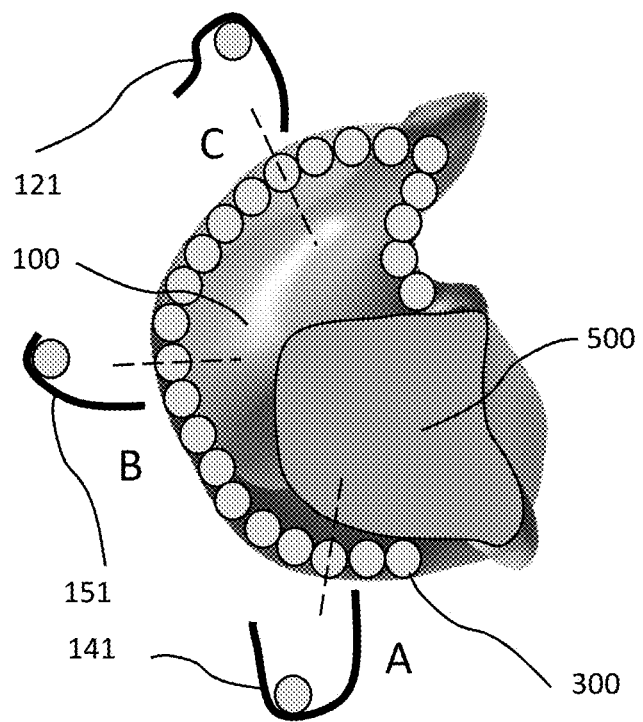
FIGS. 2A-2B show modeling of Skeleton.
Figure 2B:
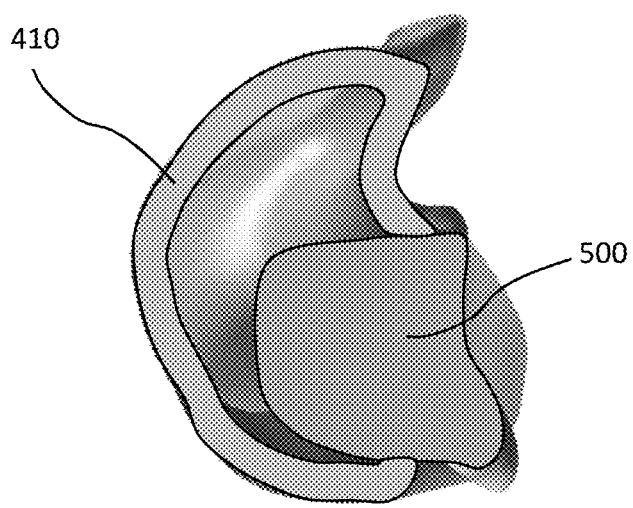

The custom styles of the posterior concha module 400 include, but are not limited to:

The Skeleton 410 is a continuous ring extending from the anti-tragus 140, through the posterior concha 150, to the helix 120, FIGS. 2A-2B.

Figure 3A:
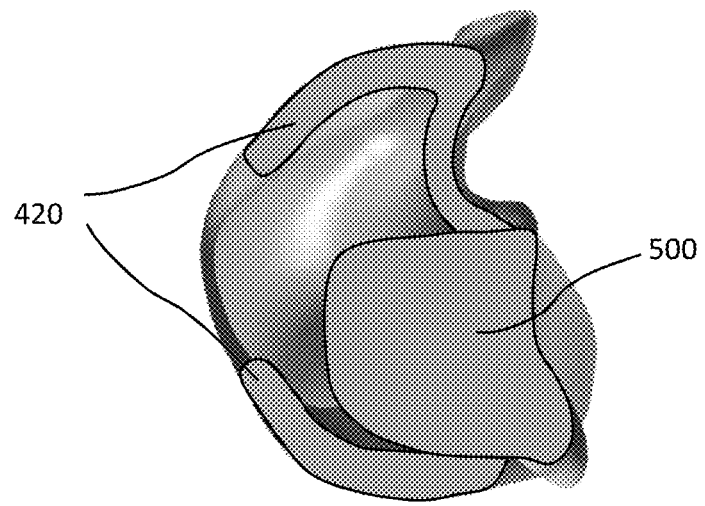
FIGS. 3A-3B show modeling of Semi-skeleton, Helix-lock, and Canal-lock.

The Semi-skeleton 420 is an open ring that does not include the posterior concha 150, FIG. 3A.

Figure 3B:
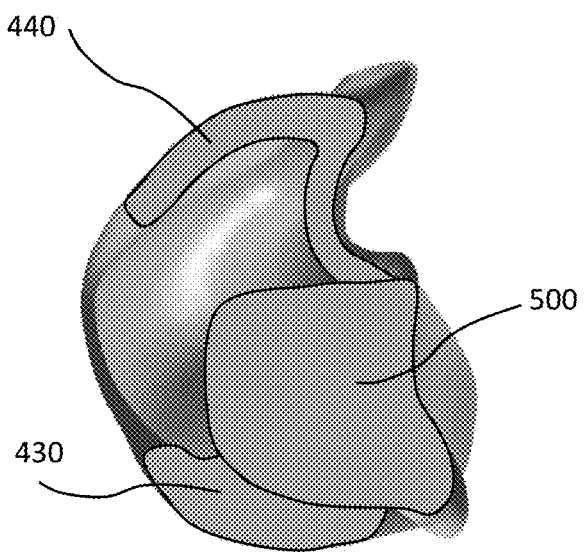

The Canal-lock 430 is a worm-like protrusion from the concha module 500 to the anti-tragus 140, FIG. 3B.

The Helix-lock 440 is a worm-like protrusion from the concha module 500 to the helix 120, FIG. 3B.

Figure 4A:
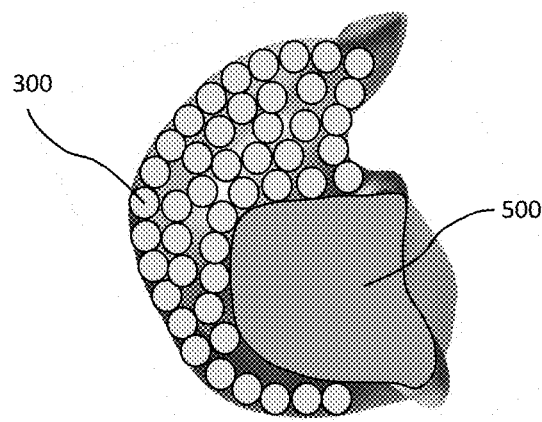
FIGS. 4A-4B show modeling of Full-shell and Shell.
Figure 4B:
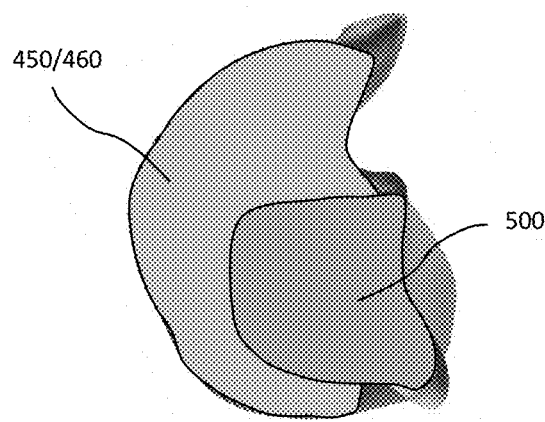

The Shell 450 is a plate of uniformed thickness that fills the helix 120, tragus 130, anti-tragus 140, and the back of the concha 150, FIGS. 4A-4B.

The Full-shell 460 fills the entire posterior concha, including the helix 120, tragus 130, anti-tragus 140, and the back of the concha 150, FIGS. 4A-4B.

FIG. 2A shows 3D inserts 300 required for modelling the posterior concha module 400.

Prior to filling the posterior concha of the digital impression 100 with the 3D inserts 300, the custom concha module 500, previously modelled from the same digital impression 100 is selected from a computer database and placed in the digital impression 100.

The 3D inserts 300 are placed in the undercuts of the helix 121, anti-tragus 141, and the back of the concha 151, as required for the style of the hearing aid shell or earmold, see FIG. 2A for example.

The size and shape of the 3D insert 300 depends on the required level of modeling accuracy. Different areas of the posterior concha can be filled with varying sizes and shapes of the 3D inserts. Further, a single or a multilayer of the 3D inserts 300 can be employed to achieve the desired thickness of the posterior concha module 400.

Figure 5A:
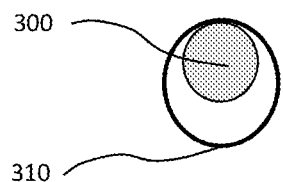
FIGS. 5A-5D show the use of the buffer.

The fit of the 3D inserts 300 that have a contact area with the digital impression 100 is customized with the buffer 310, as shown in FIG. 5A.

Figure 5B:
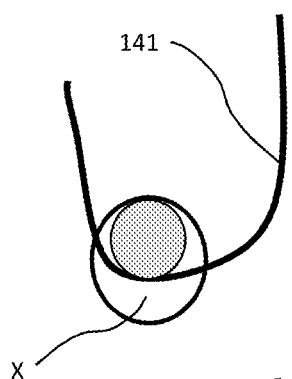
Figure 5C:
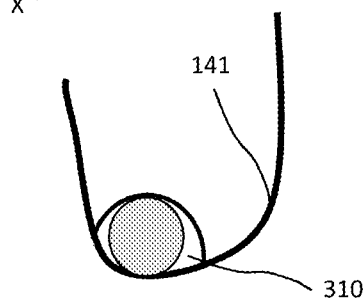

The buffer 310 does not trigger collisions with the digital impression 100. In the area, for example X, where the buffer 310 crosses the anti-tragus line 141, the buffer is modified to accommodate the shape of the digital impression 100, FIGS. 5B-5C.

Figure 5D:
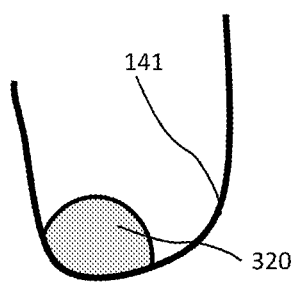

The 3D insert 300 and the modified buffer 310 are merged into the customized 3D insert 320, FIG. 5D, which closely conforms to the shape of the digital impression 100.

The customized 3D inserts are merged into the 3D virtual custom posterior concha module 400 in the style 410, 420, 430, 440, 450, or 460 specified in the order form.

Figures 6A, 6B:
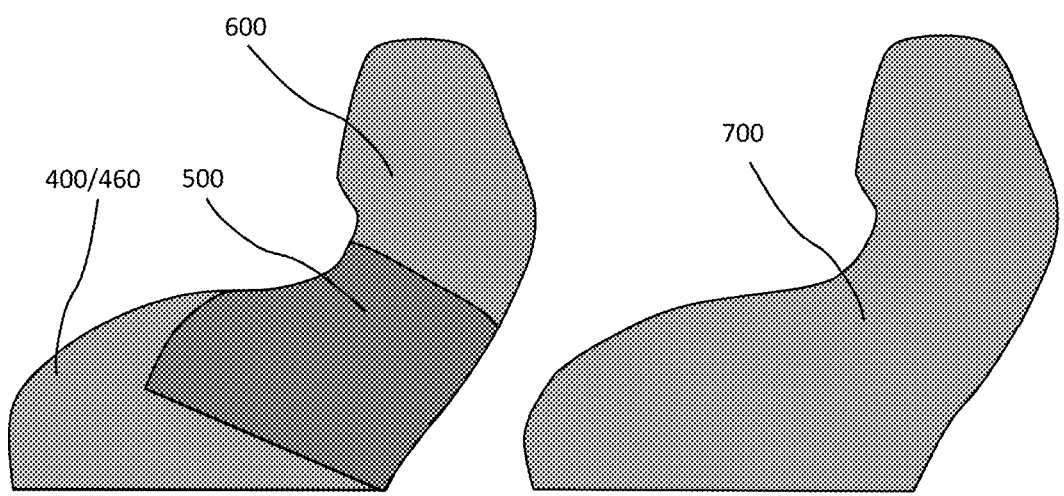
FIGS. 6A-6B show the posterior concha module, the concha module, and the canal module integrated into a hearing aid shell.

The 3D virtual custom posterior concha module 400, in this example the Full-shell style 460, is integrated with the concha module 500 and the canal module 600 into a virtual custom hearing aid shell 700, or earmold, see FIGS. 6A-6B.

Smoothing the integration area is administered to define round contours.

A software operator fine-tunes the shape of the virtual custom hearing aid shell 700, if required.

GLOSSARY OF TERMS

1. Anterior refers to a structure being more in front than another structure in the body.
2. Aperture is the entrance to the ear canal.
3. Buffer is a device used as a cushion.
4. Concha is the hollow region in front of the ear canal.
5. Contact area is the surface area where two objects touch and are in contact with each other.
6. Dome is a shape like one-half of a ball.
7. Ear canal is a tube running from the outer ear to the middle ear.
8. Earmold is a device worn inserted into the ear for sound conduction.
9. Fit means to be of the right shape.
10. Fit rate indicates the benefit of a given custom product.
11. Hearing aid is an amplification device worn in or on the ear.
12. Helix is the prominent rim of the external ear.
13. Hollow is having a cavity inside.
14. Insert is a device made for a particular purpose.
15. Lateral refers to a structure being further away from the median plane than another structure in the body.
16. Mould is a device shaped to fit an ear.
17. Posterior refers to a structure being more in back than another structure in the body.
18. Shape is the outline of an area or figure.
19. Solid is having the interior filled up.
20. Surface is any face of a body or thing

LIST OF REFERENCE NUMERALS

100 Digital ear impression
110 Concha
120 Helix
121 Undercut of helix
130 Tragus
140 Anti-tragus
141 Undercut of anti-tragus
150 Back of concha
151 Undercut of the back of concha
160 Ear canal
300 3D insert
310 Buffer
320 Customized 3D insert
400 Posterior concha module
410 Skeleton
420 Semi-skeleton
430 Canal-lock
440 Helix-lock
450 Shell
460 Full-Shell
500 Concha module
600 Canal module
700 Hearing aid shell

What is claimed is:

1. A method of virtually shaping a custom posterior concha module from a digital impression of an ear, comprising the steps of:
   a. opening, with one or more computing devices, a file with the digital impression of the ear obtained by a volumetric imaging technique;
   b. selecting from a computer database, executable by one or more processors, a 3D insert;
   c. placing, executable by one or more processors, the selected 3D insert in a posterior concha of the digital impression;
   d. repeating step c to fill the posterior concha of the digital impression with the selected 3D insert;

e. adding, executable by one or more processors, a buffer to each selected 3D insert having a contact area with the digital impression;
f. modifying, executable by one or more processors, a shape of the buffer to customize the contact area between the selected 3D insert and the digital impression;
g. merging, executable by one or more processors, the selected 3D insert with the modified buffer into a customized 3D insert;
h. repeating step g for each selected 3D insert having a contact area with the digital impression;
i. integrating, executable by one or more processors, all customized 3D inserts into a 3D virtual custom posterior concha module and smoothing edges to define round contours;

wherein steps a to i are automatically executed by one or more computing devices.

* * * * *